United States Patent
Peng et al.

(10) Patent No.: US 12,450,381 B2
(45) Date of Patent: Oct. 21, 2025

(54) COMPACTED OBJECT EXPRESSION FOR USER PERMISSIONS

(71) Applicant: SAP SE, Walldorf (DE)

(72) Inventors: Rufeng Peng, Walldorf (DE); Mingfeng Lu, Walldorf (DE); You Li, Walldorf (DE)

(73) Assignee: SAP SE, Walldorf (DE)

( * ) Notice: Subject to any disclaimer, the term of this patent is extended or adjusted under 35 U.S.C. 154(b) by 148 days.

(21) Appl. No.: 18/488,428

(22) Filed: Oct. 17, 2023

(65) Prior Publication Data

US 2025/0124154 A1   Apr. 17, 2025

(51) Int. Cl.
*G06F 21/62* (2013.01)
*H04L 9/32* (2006.01)

(52) U.S. Cl.
CPC ........ *G06F 21/6218* (2013.01); *H04L 9/3236* (2013.01); *G06F 2221/2141* (2013.01)

(58) Field of Classification Search
CPC ......... G06F 21/6218; G06F 2221/2141; H04L 9/3236
See application file for complete search history.

(56) References Cited

U.S. PATENT DOCUMENTS

| | | | | |
|---|---|---|---|---|
| 8,566,952 | B1* | 10/2013 | Michaels | G06F 21/6218 726/30 |
| 11,570,180 | B1* | 1/2023 | Fitzpatrick | H04L 9/0643 |
| 12,223,065 | B1* | 2/2025 | Fathalla | G06F 21/604 |
| 2021/0036854 | A1* | 2/2021 | Dunjic | H04L 9/3213 |
| 2021/0112067 | A1* | 4/2021 | Pandey | G06F 3/0644 |
| 2021/0124835 | A1* | 4/2021 | Tran | H04L 63/20 |
| 2021/0209077 | A1* | 7/2021 | Snellman | G06F 9/541 |
| 2022/0051756 | A1* | 2/2022 | Notz | G06N 7/00 |
| 2023/0283613 | A1* | 9/2023 | Pandey | G06F 21/602 726/22 |
| 2024/0015148 | A1* | 1/2024 | Martini | H04L 63/102 |
| 2025/0053510 | A1* | 2/2025 | Colgrove | G06F 3/067 |
| 2025/0053676 | A1* | 2/2025 | Yang | G06F 21/602 |
| 2025/0077498 | A1* | 3/2025 | Hudson | H03M 7/702 |
| 2025/0077699 | A1* | 3/2025 | Ramos | G06F 21/6227 |
| 2025/0094386 | A1* | 3/2025 | Higgins | G06F 16/2471 |
| 2025/0094403 | A1* | 3/2025 | Chintala | G06F 16/2272 |
| 2025/0110919 | A1* | 4/2025 | Vasudeva | G06F 16/116 |
| 2025/0124152 | A1* | 4/2025 | Suresh | G06F 21/6218 |
| 2025/0124156 | A1* | 4/2025 | Beecham | G06F 16/9024 |
| 2025/0131118 | A1* | 4/2025 | Zaharia | G06F 21/6218 |

* cited by examiner

*Primary Examiner* — Stephen T Gundry
(74) *Attorney, Agent, or Firm* — Buckley, Maschoff & Talwalkar LLC

(57) ABSTRACT

Provided is a system that can validate a permission of a user with respect to data based on a hash value generated from a permission object. The hash value may be hashed more than one during the validation process. In one example, the method may include storing application data in a data store, receiving a request to access the application data within the data store, the request comprising an identifier of a user and a hash value, retrieving a permissions object of the user and hashing fields of data within the permission object to generate a locally-generated hash value, determining whether or not the locally-generated hash value is a match to the hash value in the received request, and in response to the determination that the locally-generated hash value is the match, granting permission to the application data in the data store.

17 Claims, 9 Drawing Sheets

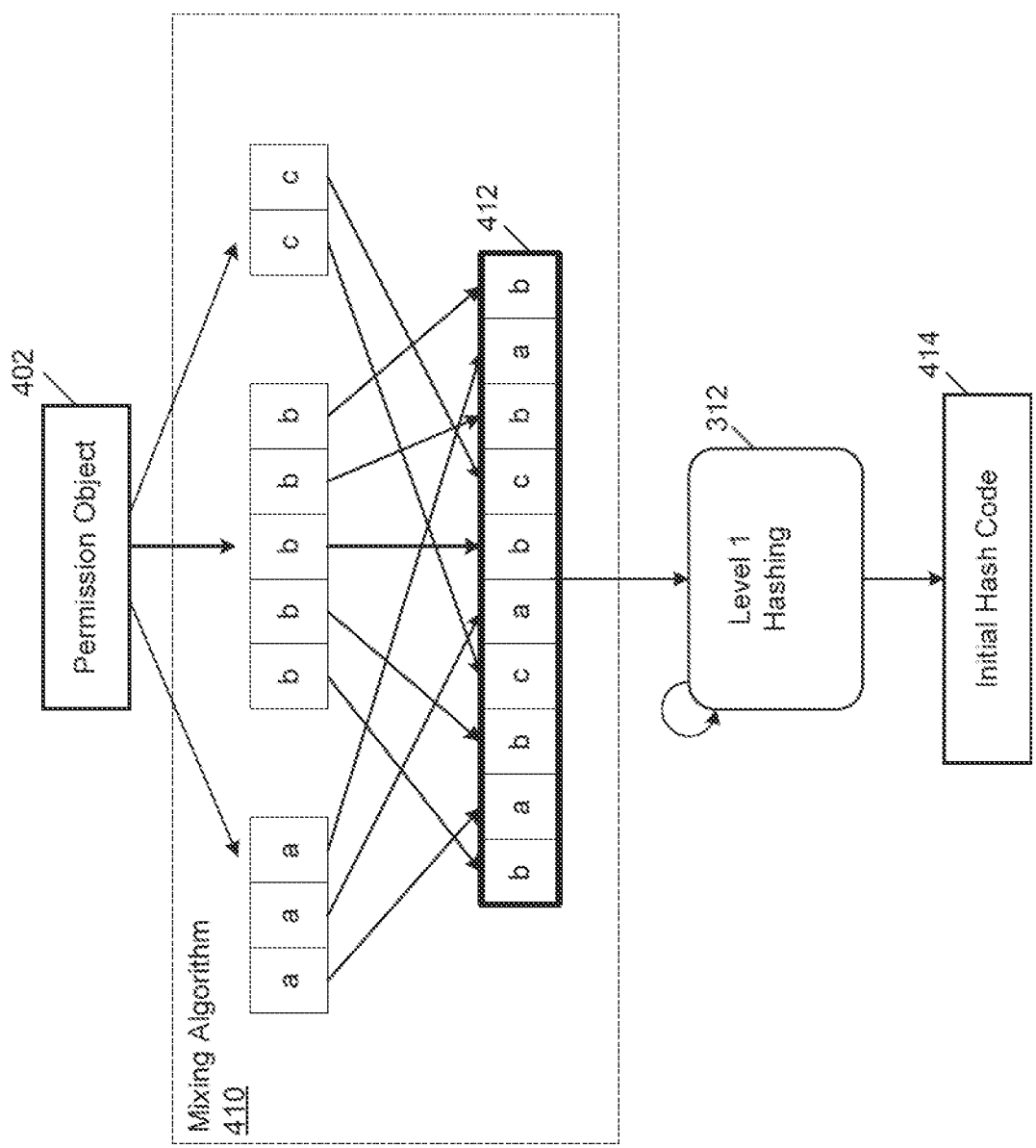

COMPACTED OBJECT EXPRESSION FOR USER PERMISSIONS

BACKGROUND

User permissions are often used by a database (or other storage) to define which data a user can access within the database. For example, user permissions can be used to define permission to data stored in a table within the database, a dimension within the table, a row within the dimension, a data model of the database, etc. Some databases store their permissions as "objects" which can be queried at runtime when the user requests data from the database. For example, the user may submit a query to the database (e.g., via a software application) with a request for access to data. In response, the database can find the user's permission object, read the permissions of the user from the object, and determine whether the user has permission to the requested data. User permissions do not change much over time. To increase processing response efficiency, a database will store user permissions in a cache instead of on disk.

BRIEF DESCRIPTION OF THE DRAWINGS

Features and advantages of the example embodiments, and the manner in which the same are accomplished, will become more readily apparent with reference to the following detailed description while taken in conjunction with the accompanying drawings.

FIGS. 4A-4B are diagrams illustrating a mixing algorithm be applied to different sets of data in accordance with an example embodiment.

DETAILED DESCRIPTION

Figure 1A:
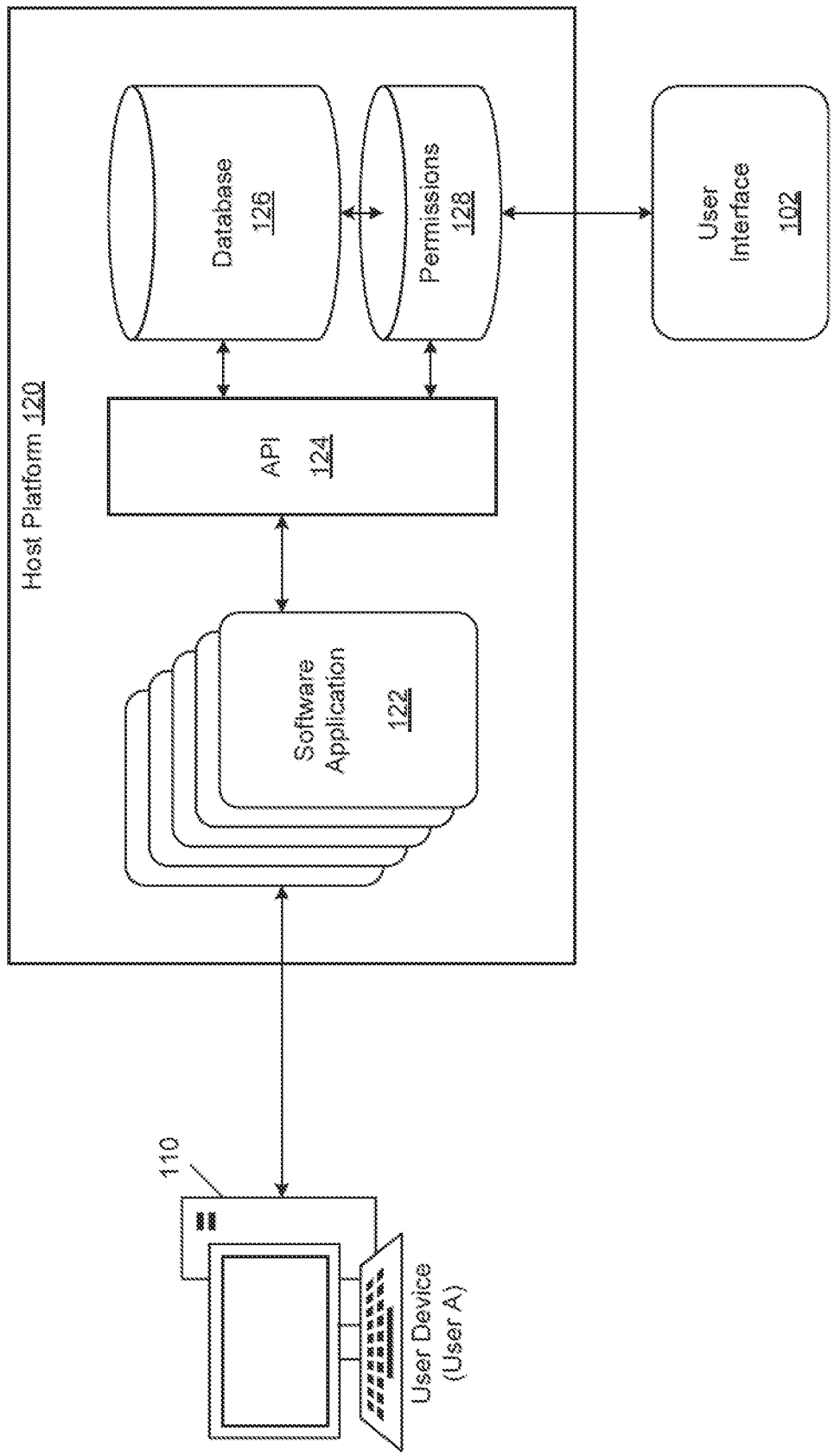
FIG. 1A is a diagram illustrating a host platform that performs access controls based on compacted object permissions in accordance with an example embodiment.

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

The example embodiments are directed to a data store (such as a database) in which user permissions are stored as objects in an object data store. The objects can be queried using a unique object ID, which is often related to a user the corresponds to the object. For example, user A may have a permission object that is identified with the unique identifier USERA. The permission objects are often held in a cache where they can be accessed faster and more efficiently than on disk. However, a size of the cache is very limited. Therefore, strategic usage of the cache is critical to obtain the best system performance. In many cases, the cache may also need to store other data. Therefore, any reduction in the data stored in the cache is going to make the cache more available and the database more likely to be efficient.

In the examples embodiments, the permission object is encoded thereby converting the object (including all of the permissions inside the object) into a single string value, for example, 64 bit, or the like. As just an example, a user may have four different permissions (e.g., read, execute, maintain, share, etc.) with respect to a table of data. These four permission can be compacted into a single string value via the encoding process described herein. Thus, each of the four permissions can be validated using only a single static string value rather than an entire permission object. This same process can be repeated for each of the permission objects in the database thereby converting the permission objects into strings that consume significantly less storage space than the permission objects. Thus, the permission objects can be removed from the database (e.g., the cache) to make room for different data and also make the permissions process itself much faster.

Each permission object can contain permissions of the user with respect to other "objects" stored by the database. The other objects may include models of data, analytic models, data sets, database tables, files, workspaces, schedules, connections, etc. that are stored as objects in the database. For each object, a user may have multiple permissions. Each permission may then be stored in permission object with other permissions such as the multiple permissions the user has for that object and any other objects. The permissions within the objects may be defined through a user interface. For example, a system administrator may define the permissions of a user with respect to the different attributes of data, software, etc., used by the user on the platform.

In the database, a "space" may be defined which introduces a layer separation from the data within that space and the data, software, etc., that is held in other spaces in the database. Access to a given space requires explicit member assignment, which introduces segregation of responsibilities, and isolation of content. Spaces are quite flexible and can be used in several ways. For example, one could define one space per line of business (e.g., human resources, financial data, asset management, etc.)

When selecting a space, a user can define a model, much like one would in a cloud instance. For example, the model may include table definitions, views, table functions, calculation views (also known as analytic models), data flows, and the like. A user can combine and reuse multiple models to create new ones, using structured query language (SQL) operators like JOINS, add filters with WHERE conditions, calculated columns, input parameters, associations, etc., and finally preview their data to confirm it was modeled correctly. Besides, analyzing a model's impact (which entities consume it) and lineage (which entities it depends on) is a very useful tool provided by the datasphere. Furthermore, it is possible to share models across spaces, with third party application, or access them directly with a SQL technical user.

Before sharing their data model externally, the user may desire to set accessibility rights to their data. One common approach is to establish that some applications or users can only see a subset of columns (column-level security), or a subset of rows (row-level security). In other words, if a manager for region A accesses a global sales data model, it would be reasonable to assume that they would only see the sales rows for their region A, and not of the other regions B, C, and D. This is especially true for sensitive or personal data. To integrate such functionality, the database can implement permission objects for the users.

Most enterprise applications have some sort of native concept of row-level security, which may be referred to herein as Data Access Controls or DAC. The example embodiments may provide a more efficient application of this functionality through the user of a hash code that is generated by encoding a permission object. As such, the database is not required to load a permission object from the cache, read the multiple fields of values therein, and make a decision. Instead, the database can simply look at a hash code (string value) that can be used to validate multiple user permissions (even at the same time).

The user flow for creating and applying row-level security, then consuming that model may be performed as follows. First, the system may define the data to be protected and shared externally, e.g., product sales data categorized by product and country. The system may create a different permission object for each user which contains authorization data of that respective user. The system may create a Data Access Control (DAC) consuming the permissions object containing the authorization data for each user. When a user requests access to unprotected data, the system may create a view on top of the unprotected dataset based on the permissions included in the permission object consumed by the DAC which hides/protects the data that the user is not authorized to access. With the data protected, the system may share a view of the data set with another space, application, the user, etc.

As another example, a developer can build their models on top of the protected dataset, instead of the unprotected one. Accordingly, a user within a first space in the data store may share data to external consumers (another space or application). Here, the data that is shared is a protected version of a dataset that originally belongs to them. Some characteristics of Data Access Controls include that they can be attached to structured query language (SQL) Views, table functions, calculation views, and the like. These are referred to as DAC consumers. The permissions to the data shown in the views are determined by the permission object of the user requesting the data.

In the example embodiments, data access controls do not load content from a permission object, nor read the fields of values stored in the permission object. Instead, a simple string value can be used to verify whether or not a user has access privileges to a piece of data requested from a data store such as a database. The string value may be created ahead of time (for all users) and stored in the database thereby replacing the existing permissions objects with string values. As such, the amount of space in the cache that is needed for storing user permissions can be reduced significantly. For example, the string value may be a 64 bit value, a 128 bit value, or the like. Meanwhile, the permission object itself could be ten times larger than that or more.

Figure 1B:
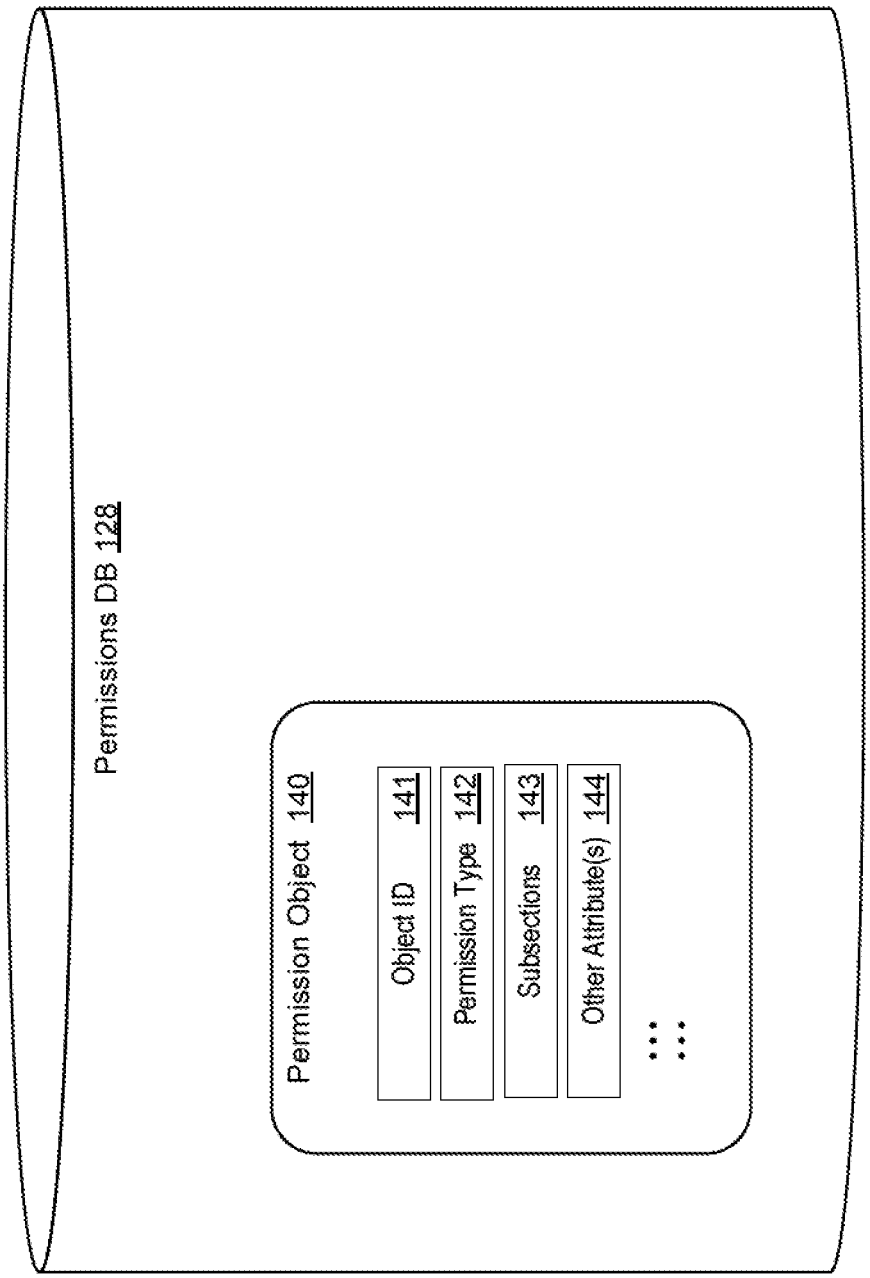
FIG. 1B is a diagram illustrating a permission object of a user in accordance with an example embodiment.

FIG. 1A illustrates an environment 100 that includes a host platform 120 that performs access controls based on user permissions in accordance with an example embodiment, and FIG. 1B illustrates an example of permission object which defines permissions of a user with respect to a database including the data, data models, etc. stored in the database. Referring to FIG. 1A, a user may access one or more software applications 122 hosted on the host platform 120 via a user device 110 such as a personal computer, a mobile device, a smart-wearable, and the like. The user device 110 may connect to the host platform 120 over a computer network such as the Internet.

In the example of FIG. 1A, the one or more software applications 122 store data in a database 126. In this example, the database 126 includes an application programming interface (API) 124 that manages access to the database 126. In addition, the database 126 also includes a permissions storage 128 which may include data objects that are stored in the database 126 or in a separate storage. The permissions storage 128 may store permission objects which define data access controls to the data that is stored in the database 126 including data models, dimensions of data, rows of data columns of data, and the like. The permissions may enable the user to perform certain activities including reading, writing, modifying, deleting, creating, and the like. The permissions storage 128 may be generated by an owner of the data via a user interface 102.

Figure 2:
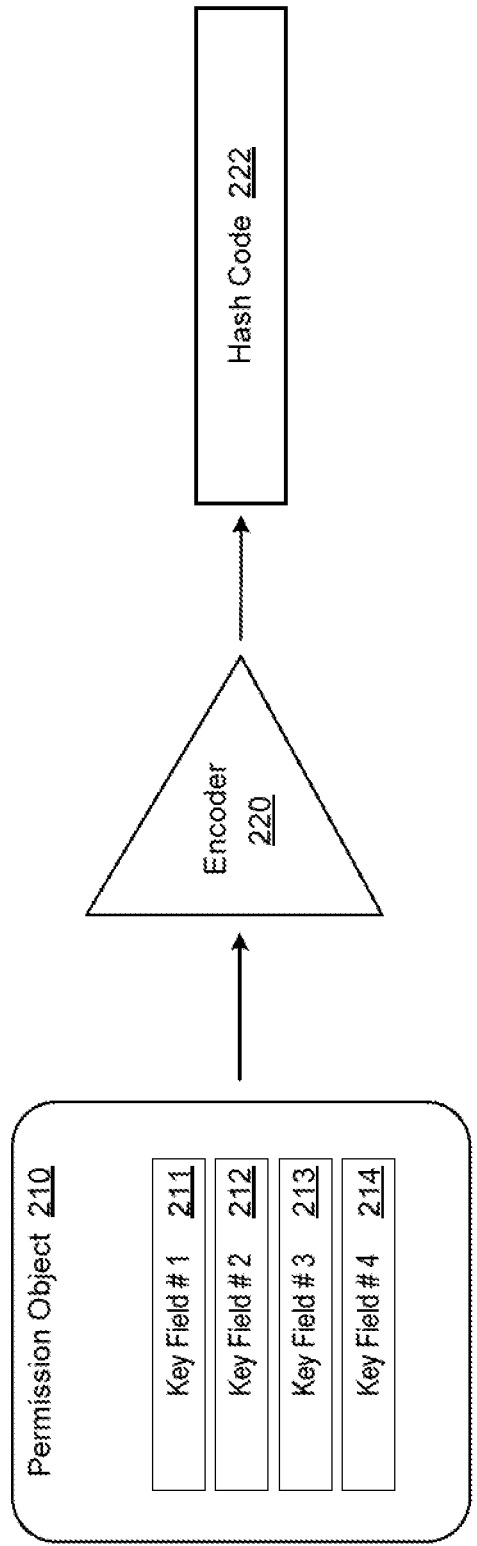
FIG. 2 is a diagram illustrating an encoder that converts a permission object into a hash value in accordance with an example embodiment.

In the example of FIG. 1A, the user device 110 accesses the data through the one or more software applications 122 hosted on the host platform 120. As another example, the access may be performed by a different software application instead of a user. For example, a software application running on the host platform and storing data within a different space in the database 126 may request access to the user's data stored in a different space within the database 126. In this case, the data may be accessed by the different space. However, prior to and/or during this access, the permissions may be applied to limit which data is made accessible to the different space before the data is accessed. Here, the database 126 can restrict access using a hash code that is encoded with multiple different user permissions. An example of a hash code is hash code 220 that is shown in FIG. 2, and further described below.

Referring now to FIG. 1B, a user's permissions are stored within a permission object 140 which includes a plurality of fields including a field 141, a field 142, a field 143, and a field 144 which each include one or more values stored therein. In some embodiments, the permission object may be role-specific, meaning that it applies to all users that have a particular "user role" within an organization. An example of a user role is a role of a particular user within a department of an organization. The user's manager in the same department or a different user in a different department may have access to additional/different files, applications, data, etc., than the user. The fields may define attributes about a user (or a group of users), attributes about an item to which the permissions apply such as a document, a database table, a software application, an identifier of a type of permission such as update, read-only, delete, write, etc., and the like. It should also be appreciated that the data fields within the permission object are not limited to any particular identifying information and may include other fields of data associated with other objects in the database to which the permission apply.

In the example of FIG. 1B, the field 141 may correspond to an identifier of the permission object 140 which may be unique to the permission object such as an identifier of the document, table, software, etc. which the permission applies. The permission object 140 also includes the field 142 which defines permission types such as read, write, read-only, etc., the field 143 which identifies a first permission to a first field within a data object, the field 144 which identifies a second permission that the user has with respect to the data object, and the like.

The permissions within the permission object 140 define rules which restrict data access by the user or a user with a particular role/category within an organization. In some cases, the permission object 140 may be consumed by another entity (e.g., a digital access control node) which executes the permissions and performs the data control/restriction prior to providing the user with access to the data.

Protecting the data set may be a multi-phase process. During a first phase (i.e., design time), access rules within the permission object 140 can be defined for the data set by a user such as an administrator, an owner of the data set, or the like, via the user interface 102 shown in FIG. 1A. The permissions include abilities allowed for the user (e.g., create, read, update, delete, etc.) on specific types of objects (e.g., tables, models, etc.) within the database. The rules are essentially a model for accessing the data set, and may be referred to herein as an "authorization model". With the authorization model developed during the first phase, the authorization model can then be applied to data access events during a second phase (i.e., runtime).

FIG. 2 illustrates a process 200 performed by an encoder 210 that converts a permission object 140 into a hash value (e.g., hash code 220) in accordance with an example embodiment. Referring to FIG. 2, the permission object 140 may include a plurality of fields of data values stored therein including the field 141, the field 142, the field 143, and the field 144 with data values therein. The fields may be used to define user permissions of a user with respect to data stored at the database. The permissions may permit certain activities with respect to a particular object of data.

In the example of FIG. 2, content from the permission object 140 may be input to an encoder 210 (encoding module) that first mixes the different sequences of characters from the permission object 140 based on length and forwards that result into a hash function to generate hash code 220. The hash code 220 is a single string value (e.g., 64 bit, 128 bit, etc.) that is encoded with multiple user permissions from the fields of data values stored in the permission object 140. The hash code 220 can fit inside of the field 141 of the permission object (i.e., stored within the object ID field) and can be used in place the other fields 142, 143, 144, etc., of the permission object 140. The hash code 220 can then be stored in cache instead of the entire permission object 140. The hash code 220 may also be stored with the unique ID of the permission object enabling the database to subsequent retrieve the hash code 220 when a request associated with the permission object is received from a software application.

In the example embodiments, the content (e.g., the fields, values, attributes represented, etc.) may be different depending on implementation. In addition, the number of fields/values used by an implementation may be different than another implementation. The fields within the permission object may be referred to as "key fields" which uniquely identify the item that corresponds to the permission. For example, if the user permission refers to the ability of the user to view a preview of a vehicle's data on an advertising platform. Here, the vehicle data may be stored in an underlying vehicle data object within a database. Here, the key fields may uniquely identify the vehicle from among all other vehicles (and all other vehicle data objects). For example, the key fields may include a make, model, and license plate number. As another example, the key fields may include a name, a VIN, and an address. There is no limit to the types of data that may be included in the fields.

It should also be appreciated that the database may store permissions of multiple users to the same data within a single permission object. As another example, the database may store permissions of a single user with respect to multiple data objects within a single permission object. As another example, a user may have multiple permission objects which define permissions of the user for multiple data objects, respectively.

Figure 3:
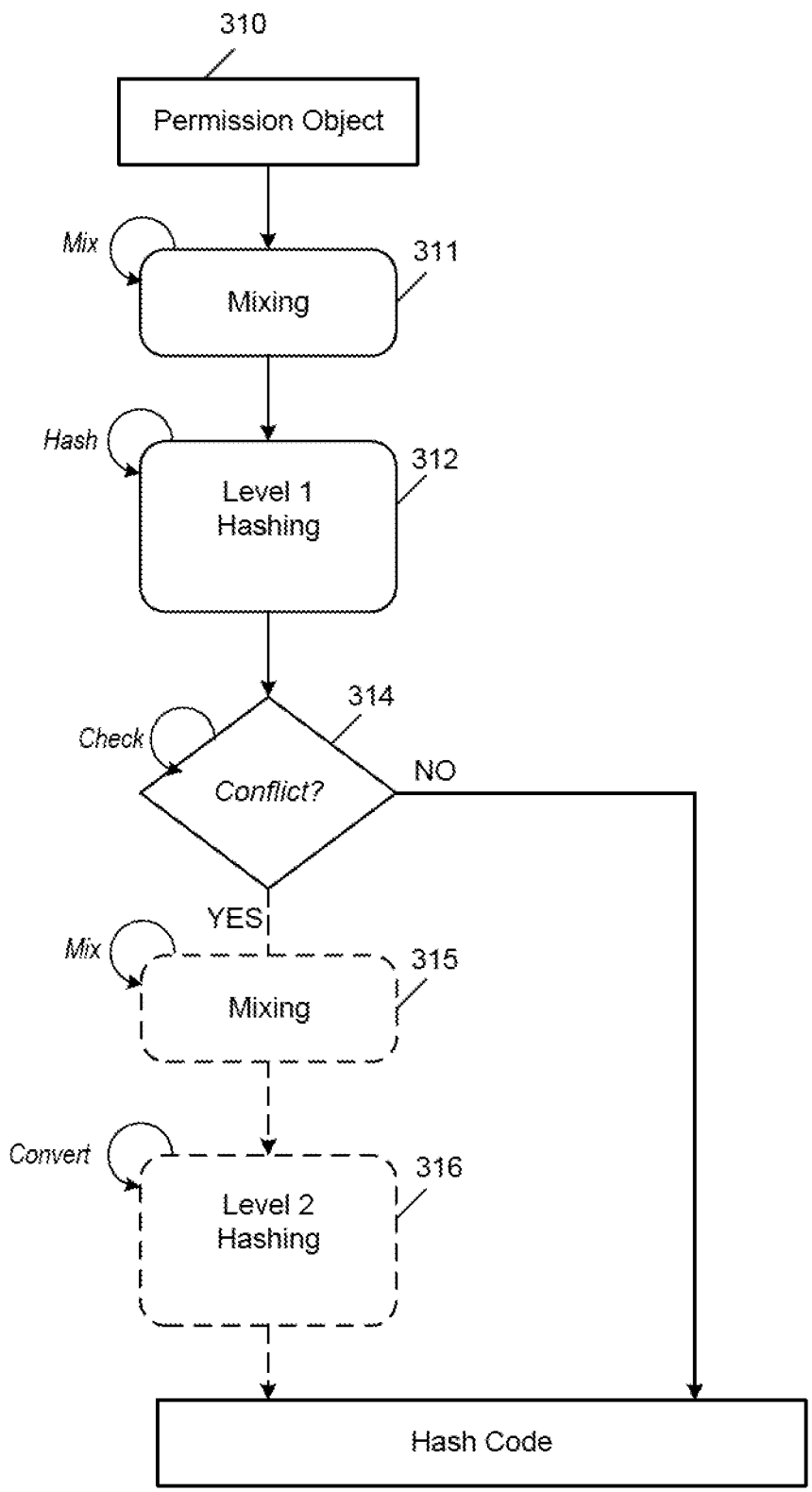
FIG. 3 is a diagram illustrating a process of converting the content of a permission object into a hash code in accordance with an example embodiment.

FIG. 3 illustrates a process 300 of converting the content of a permission object into a hash code in accordance with an example embodiment. The process may be performed on multiple/many permission objects at the same time (i.e., simultaneously). In this way, the process 300 may simultaneously convert a plurality of permission objects into a plurality of hash codes, respectively.

The process may be a single phase encoding process or a multi-phase encoding process. In some cases, the decision on whether the process performs one hash function/verification or two hash functions/verifications is determined dynamically at runtime based on whether the first hash code generated by the first hashing process is a conflict with another hash code of another user already stored in the database. If that is the case, the system may dynamically execute a second hash function/verification using a different hash function. Before executing either hashing process, the data can be modified with one or more mixing algorithms to ensure that the second hash value is not a conflict with another existing hash code of another user's permissions.

Referring to FIG. 3, the process 300 begins with receipt of a permission object 310 which is stored within a database or other data store. As an example, the permission object may be input to the encoder 210 shown in FIG. 2, and the encoder 210 may perform the process 300 that is shown in FIG. 3. For example, in 311, the encoder may extract data values from fields within the permission object and rearrange or otherwise intermix bits of data from fields of the permission object based on a predefined mixing algorithm such as shown in the example of FIG. 4A. In addition, in 312, the encoder may execute a hash function, or Level 1 hash, on the mixed bits of data to generate an initial hash code. The hash code may be a 64 bit/character value. However, the size of the hash code is not limited to 64 bits and may be a different size such as 32 bit, 128 bit, or the like.

In 314, the encoder may compare the initial hash code to existing hash codes of other users which are already being used for permissions (i.e., permission objects that have already been converted into hash codes, etc.). If no conflict exists, a distinguishing bit/character, such as a 0 bit, is appended to the result of the level 1 hash and the encoding process terminates with the initial hash code with the appended bit set as the final hash code.

However, if in 314, the encoder determines that the initial hash code is a conflict (match) to another hash code already in the system, in 315, the encoder may perform a mixing operation on the extracted data values from the permission object in 316, and the encoder may perform a different predetermined hash operation, a level 2 hash, on the initial hash value to generate a subsequent hash value. The subsequent hash value is then appended with a distinguishing bit/character, such as a 1 bit, and stored as the hash code of the permission object 310. The distinguishing bit is used to separate those hash values saved after the level 1 hash from those hash values saved after the level 2 hash. The additional hash operation performed in 316 may be an optional hashing process that is only performed when a conflict is detected in 314. In other words, the optional hashing operation may only be initiated/invoked when the initial hash code matches another hash code in the database already stored for another user. This is a conflict. Thus, the same input data can be used with a different hashing algorithm to create a different hash code that is not a conflict. As further described in the examples of FIGS. 4A and 4B, the encoder may use one mixing algorithm prior to performing the initial hashing in 312 and use a different mixing algorithm prior to the subsequent hashing in 316 to ensure that there are no conflicts with the subsequent hashing in 316.

Figure 4B:
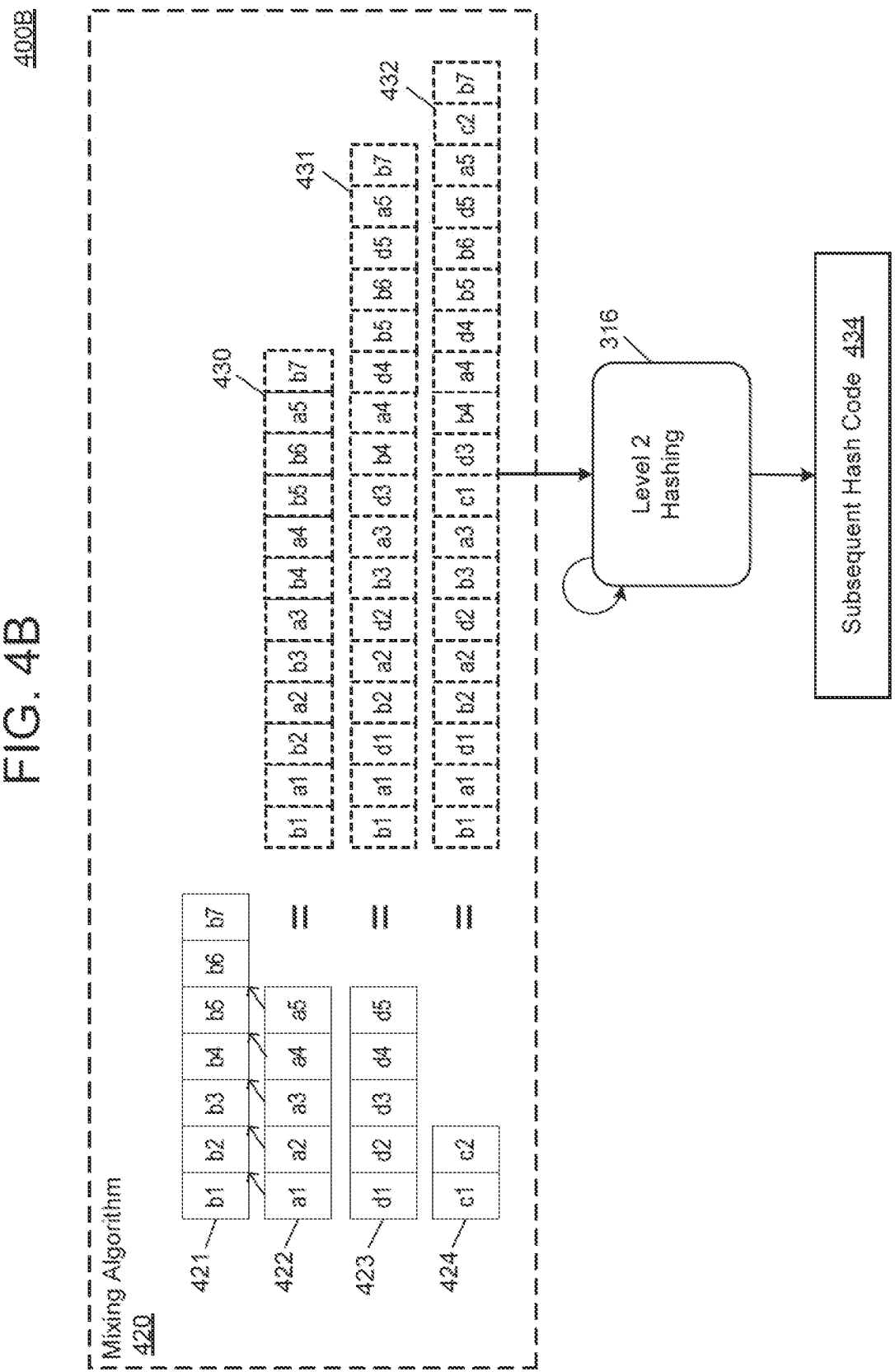

FIGS. 4A-4B illustrate examples of mixing together different sets of features using a length-based mixing algorithm in accordance with an example embodiment. For example, FIG. 4A illustrates a process 400A of mixing together three input data values (three character sequences) based on a predefined mixing algorithm 410. The mixing process may be performed on content extracted from the permission object of the user such as words, phrases, blocks of characters, etc. within the fields of data in the permission object. The mixing algorithm may serialize each key attribute into a sequence of characters and mix together the sequences based on character length. The system starts with the longest length key attribute (longest character sequence) and intersperses the second longest character sequence (key attribute) within the character sequence of the longest key attribute. The result is a mixing together of the longest two attributes in length. Next, the third longest character sequence is integrated into the mixed result from the previous two character sequences. The third longest character sequence is interspersed within the mixed result based on percentage.

In FIG. 4A, there are three pieces of input content "aaa", "bbbbb", and "cc" which are taken out of the fields of the permission object 402. In this example, the mixing algorithm 410 rearranges characters within the input content so that it is blended together as shown in the mixed input string 412. Here, characters from the first input content "aaa" are mixed together/interspersed amongst characters from other pieces of input content (e.g., "bbbbb" and "cc"). The mixing process may be performed according to a predetermined pattern or algorithm. For example, in FIG. 4A, the mixing algorithm may mix together different key attributes into a single encoding. In this example, the mixing algorithm serializes each key attribute into a sequence of characters and then selects the key attribute with the longest sequence as the starting sequence for mixing. The algorithm then mixes in the characters of a key attribute with the second longest sequence of characters based on length percentage. The mixing process repeats for the sequence of characters of each additional key attribute based on length percentage. For example, if a longest character sequence has 10 characters, and the second longest character sequence has 7 characters, the mixing operation may try to insert intersperse the characters from the second longest character sequence at equal-length distances from each other within the longest character sequence. That is, the mixing is based on character lengths of the character sequences being combined.

Once generated, the mixed input string 412 may be input into the level 1 has function for hashing. To generate the mixed input string 412 the encoder may use a predefined hash algorithm (e.g., SHA, MOMO, etc.) and dynamically set a first bit of the hash code to zero to let the system know that this is an "initial" hash code ($1^{st}$ attempt) and not a subsequent hash code ($2^{nd}$ attempt). The resulting output of the hashing is an initial hash code 414.

The database may compare the initial hash code to other hash codes (of other permission objects in the database) to determine if there is a conflict. If a conflict exists, the database may execute a second hashing function with a second and different mixing algorithm as shown in process 400B in FIG. 4B. In this example, the mixing is performed based on a mixing algorithm 420 performed on the data values based on a size of the data values within the request.

In particular, the characters within the second largest object (the object 422) are mixed together/interspersed among the characters of the first largest object (the object 421) based on a length percentage of the mixing algorithm 420. The result is an intermediate hash value 430. Next, the third largest object (the object 423) is mixed together/interspersed with the intermediate hash value 430 according to the length percentage to generate a next intermediate hash value 431. Then, the fourth largest object (the object 424) is mixed together/interspersed within the characters of the next intermediate hash value 431 according to the length percentage to generate a subsequent hash value 432 that can be input to the second hashing function in the encoder. In particular, the subsequent hash value 432 may be input to the second hashing function in 316 of the process 300 shown in FIG. 3. The output of the second hashing function is a subsequent hash value 434 which can then be compared to the hash value of the request.

Figure 5:
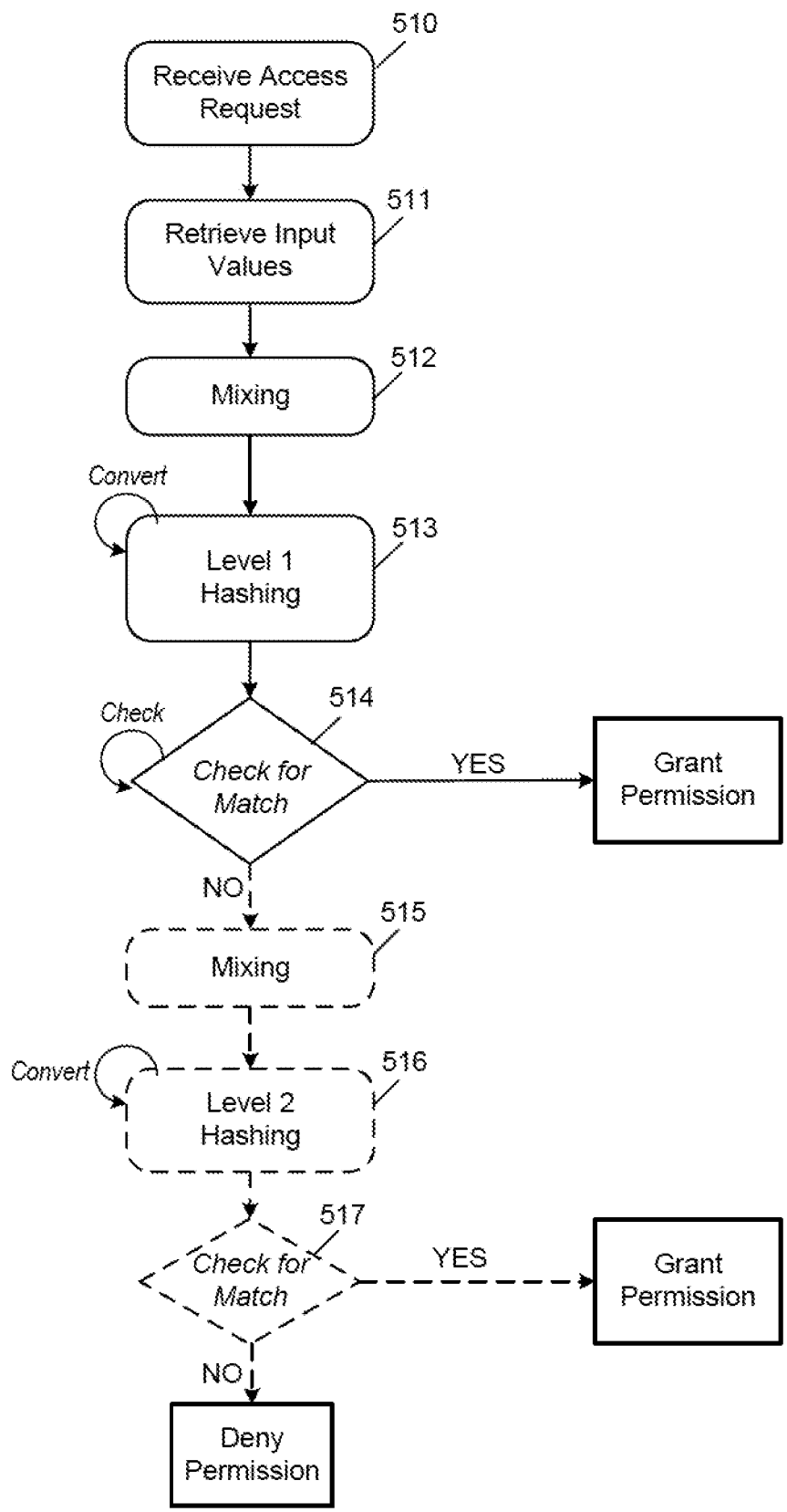
FIG. 5 is a diagram illustrating a process of verifying a user permission based on a hash code in accordance with an example embodiment.

FIG. 5 illustrates a process 500 of verifying a user permission based on a hash code in accordance with an example embodiment. The process 500 may be performed in response to a request for access to a piece of permissioned-content stored within a database such as a document, table, application, and the like. For example, a user may submit a request to the database from a software application to an application programming interface (API) and the request may be received in 510. In this example, the request may identify the user (e.g., by a user ID, object ID, permission object ID, IP address, etc.) and may also include a hash value. In response to the request, the system may retrieve input values from a permission object of the user in 511. Here, the system may identify a permission object that corresponds to the user based on the identifier included in the request. In 512, the system may extract values (e.g., sequences of characters) from the fields included in the permission object and mix the extracted values according to a predefined mixing algorithm.

The system may execute a hash function (predefined) on the extracted and mixed input values in 513 to derive an initial hash value. The mixing process performed in 512 may include the mixing algorithm 410 described in FIG. 4A, including the leading zero bit, however embodiments are not limited thereto. In 514, the system may compare the initial hash value to the received hash value that came with the request. If there is a match, the system may grant permission to the user to the requested data. For example, the database may create a view of the data that the user can access. If in 514 the system determines that the initial hash value is not a match to the received hash value, the system may perform a second attempt to verify permissions.

For example, the system may use a different hashing operation to hash the same input sequences to generate a subsequent hash value. In 515, the system may perform the mixing of the input characters sequences as is done in 511. However, in 516, a second hashing operation is performed (Level 2 hash) on the mixed sequence of characters to generate a second hash value. In 517, the system may compare the second hash value to the received hash value. If there is a match, permission is granted to the data object in question such as a file, document, table, application, service, API, etc. If not, the permission is denied, and an error response may be sent to the requesting device/software application.

Figure 6:
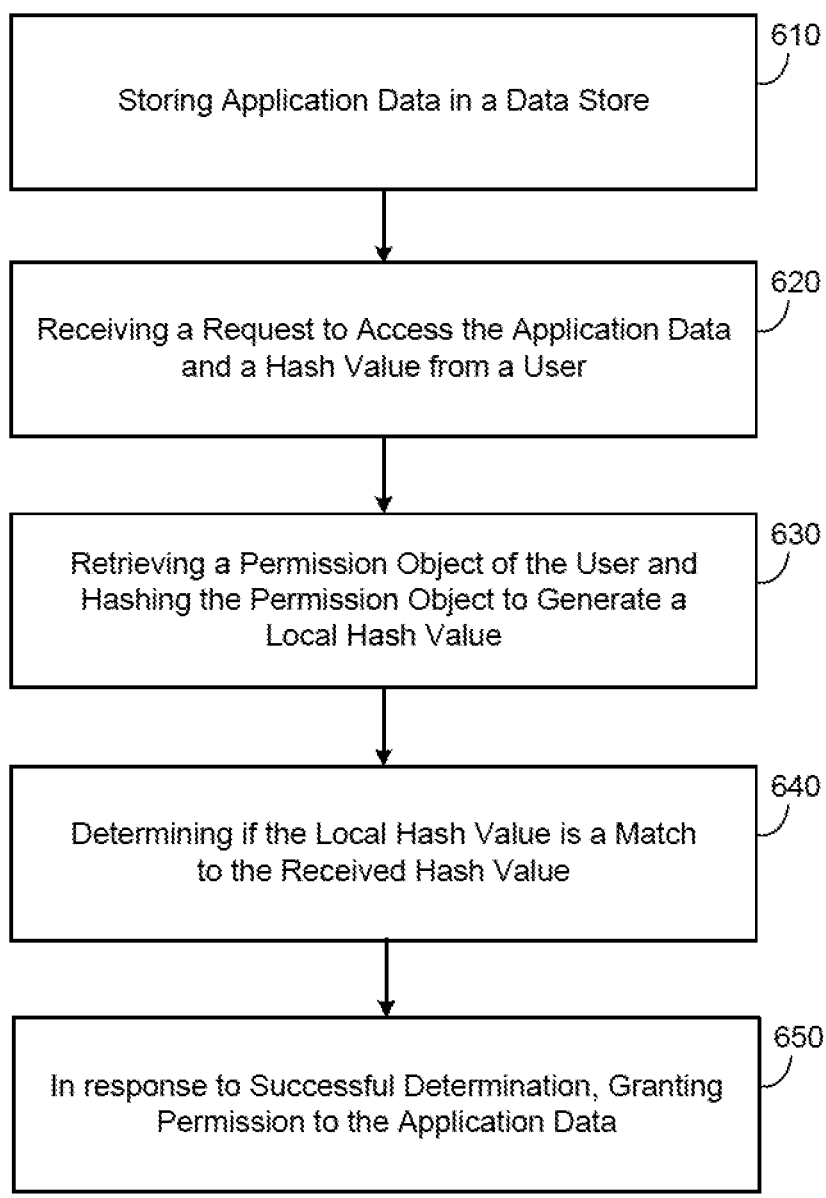
FIG. 6 is a diagram illustrating a method of verifying permissions based on a hash code in accordance with an example embodiment.

FIG. 6 illustrates a method 600 of verifying permissions based on a hash code in accordance with an example embodiment. For example, the method 600 may be performed by a host platform such as a server, a cloud platform, a user device, a software program, a combination thereof, and the like. Referring to FIG. 6, in 610, the method may include storing application data in a data store. The application data may include data of multiple users of a software application. In this example, the software may have restrictions which limit access to the data by some or all of the users.

In 620, the method may include receiving a request to access the application data within the data store, the request comprising an identifier of a user and a hash value. In 630, the method may include retrieving a permissions object of the user and hashing fields of data within the permission object to generate a locally-generated hash value. In 640, the method may include determining whether or not the locally-generated hash value is a match to the hash value in the received request. In 650, in response to the determination that the locally-generated hash value is the match, the method may further include granting permission to the application data in the data store.

In some embodiments, the executing may include executing a predefined hash function on a plurality of values stored in a plurality of fields of the permission object to generate a single string value. In some embodiments, the executing may include mixing together characters of words of content from the permission object in an interspersed pattern to create a single string value, and executing a predefined hash function on the single string value to generate the locally-generated hash value. In some embodiments, the permissions object may include a plurality of permissions defined for the user by a software application with respect to the application data stored in the data store.

In some embodiments, the method further comprises executing a second predefined hash function on the content from the permission object to generate a second locally-generated hash value, in response to the determination that the locally-generated hash value is not the match. In some embodiments, the method may further include determining whether or not the second locally-generated hash value is a match to the hash value in the received request, and in response to a determination of the match, granting permission to the application data stored in the data store. In some embodiments, the method may further include determining whether or not the second locally-generated hash value is a match to the hash value in the received request, and in response to a determination that the match does not exist, deny permission to the application data stored in the data store. In some embodiments, the method may further include adding a leading character to the locally-generated hash value and adding a different leading character to the second-locally generated hash value.

Figure 7:
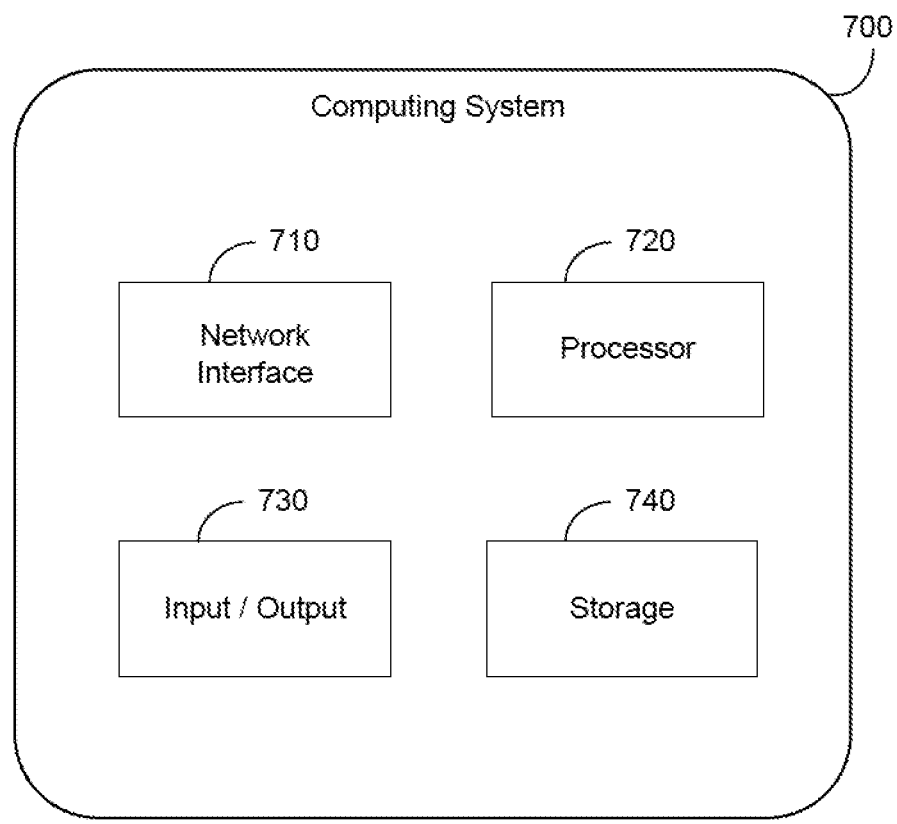
FIG. 7 is a diagram illustrating a computing system for use with any of the examples herein in accordance with an example embodiment Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

FIG. 7 illustrates a computing system 700 that may be used in any of the methods and processes described herein, in accordance with an example embodiment. For example, the computing system 700 may be a database node, a server, a cloud platform, or the like. In some embodiments, the computing system 700 may be distributed across multiple computing devices such as multiple database nodes. Referring to FIG. 7, the computing system 700 includes a network interface 710, a processor 720, an input/output 730, and a storage 740 such as an in-memory storage, and the like. Although not shown in FIG. 7, the computing system 700 may also include or be electronically connected to other components such as a display, an input unit(s), a receiver, a transmitter, a persistent disk, and the like. The processor 720 may control the other components of the computing system 700.

The network interface 710 may transmit and receive data over a network such as the Internet, a private network, a public network, an enterprise network, and the like. The network interface 710 may be a wireless interface, a wired interface, or a combination thereof. The processor 720 may include one or more processing devices each including one or more processing cores. In some examples, the processor 720 is a multicore processor or a plurality of multicore processors. Also, the processor 720 may be fixed or it may be reconfigurable. The input/output 730 may include an interface, a port, a cable, a bus, a board, a wire, and the like, for inputting and outputting data to and from the computing system 700. For example, data may be output to an embedded display of the computing system 700, an externally connected display, a display connected to the cloud, another device, and the like. The network interface 710, the input/output 730, the storage 740, or a combination thereof, may interact with applications executing on other devices.

The storage 740 is not limited to a particular storage device and may include any known memory device such as RAM, ROM, hard disk, and the like, and may or may not be included within a database system, a cloud environment, a web server, or the like. The storage 740 may store software modules or other instructions which can be executed by the processor 720 to perform the methods described herein. According to various embodiments, the storage 740 may include a data store having a plurality of tables, records, partitions and sub-partitions. The storage 740 may be used to store database records, documents, entries, and the like.

As one example, the storage 740 may include a data store that stores user data such as application data of a software application that is used by a user including personal information of the user, cookies files, user settings, preferences, etc. The processor 720 may receive a request from a user interface to access the application data within the data store. Here, the request may include an identifier of a user and a hash value. The processor 720 may retrieve a permissions object of the user and execute a predefined hash function on content from the permission object to generate a locally-generated hash value. Furthermore, the processor 720 may determine whether or not the locally-generated hash value is a match to the hash value in the received request. Furthermore, the processor may determine that the locally-generated hash value is the match, and grant permission to the application data in the data store.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), cloud storage, and the like.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
a data store configured to store application data; and
a processor configured to:
receive a request from a user interface to access the application data within the data store, the request comprising an identifier of a user and a hash value,
retrieve a permissions object of the user and execute a predefined hash function on content from the permission object to generate a locally-generated hash value,
determine whether or not the locally-generated hash value is a match to the hash value in the received request,
execute a mixing algorithm on words of content from the permission object to mix together characters of content from the words into a single string value, and execute the predefined hash function on the single string value to generate the locally-generated hash value, and
in response to the determination that the locally-generated hash value is the match, grant permission to the application data in the data store.

2. The computing system of claim 1, wherein the processor is configured to execute the predefined hash function on values stored in a plurality of fields of the permission object to generate a single string value.

3. The computing system of claim 2, wherein the permissions object comprises a plurality of permissions defined for the user by a software application with respect to the application data stored in the data store.

4. A computing system comprising:
a data store configured to store application data; and
a processor configured to:
receive a request from a user interface to access the application data within the data store, the request comprising an identifier of a user and a hash value,
retrieve a permissions object of the user and execute a predefined hash function on content from the permission object to generate a locally-generated hash value,
determine whether or not the locally-generated hash value is a match to the hash value in the received request,
execute a second predefined hash function on the content from the permission object to generate a second locally-generated hash value, in response to the determination that the locally-generated hash value is not the match, and
in response to the determination that the locally-generated hash value is the match, grant permission to the application data in the data store.

5. The computing system of claim 4, wherein the processor is configured to determine whether or not the second locally-generated hash value is a match to the hash value in the received request, and in response to a determination of the match, grant permission to the application data stored in the data store.

6. The computing system of claim 4, wherein the processor is configured to determine whether or not the second locally-generated hash value is a match to the hash value in the received request, and in response to a determination that the match does not exist, deny permission to the application data stored in the data store.

7. The computing system of claim 4, wherein the processor is configured to add a leading character to the locally-generated hash value and add a different leading character to the second locally-generated hash value.

8. A method comprising:
storing application data in a data store;
receiving a request to access the application data within the data store, the request comprising an identifier of a user and a hash value;
retrieving a permissions object of the user and hashing fields of data within the permission object to generate a locally-generated hash value;
determining whether or not the locally-generated hash value is a match to the hash value in the received request; and
in response to the determination that the locally-generated hash value is the match, granting permission to the application data in the data store;
wherein hashing comprises mixing together characters of words of content from the permission object in an interspersed pattern to create a single string value, and executing a predefined hash function on the single string value to generate the locally-generated hash value.

9. The method of claim 8, wherein the hashing further comprises executing a predefined hash function on a plurality of values stored in a plurality of fields of the permission object to generate a single string value.

10. The method of claim 8, wherein the permissions object comprises a plurality of permissions defined for the user by a software application with respect to the application data stored in the data store.

11. A method comprising:
   storing application data in a data store;
   receiving a request to access the application data within the data store, the request comprising an identifier of a user and a hash value;
   retrieving a permissions object of the user and hashing fields of data within the permission object to generate a locally-generated hash value;
   determining whether or not the locally-generated hash value is a match to the hash value in the received request;
   granting permission to the application data in the data store in response to the determination that the locally-generated hash value is the match; and
   executing a second predefined hash function on additional content from the permission object to generate a second locally-generated hash value, in response to the determination that the locally-generated hash value is not the match.

12. The method of claim 11, wherein the method further comprises determining whether or not the second locally-generated hash value is a match to the hash value in the received request, and in response to a determination of the match, granting permission to the application data stored in the data store.

13. The method of claim 11, wherein the method further comprises determining whether or not the second locally-generated hash value is a match to the hash value in the received request, and in response to a determination that the match does not exist, deny permission to the application data stored in the data store.

14. The method of claim 11, wherein the method further comprises adding a leading character to the locally-generated hash value and adding a different leading character to the second locally-generated hash value.

15. A computer-readable medium comprising program instructions which, when executed by a processor, cause a computer to perform a method comprising:
   storing application data in a data store;
   receiving a request to access the application data within the data store, the request comprising an identifier of a user and a hash value;
   retrieving a permissions object of the user and hashing fields of data within the permission object to generate a locally-generated hash value;
   determining whether or not the locally-generated hash value is a match to the hash value in the received request;
   mixing together characters of words of content from the permission object in an interspersed pattern to create a single string value, and executing a predefined hash function on the single string value to generate the locally-generated hash value; and
   in response to the determination that the locally-generated hash value is the match, granting permission to the application data in the data store.

16. The computer-readable medium of claim 15, wherein the executing comprises executing a predefined hash function on a plurality of values stored in a plurality of fields of the permission object to generate a single string value.

17. The computer-readable medium of claim 15, wherein the permissions object comprises a plurality of permissions defined for the user by a software application with respect to the application data stored in the data store.

* * * * *